(12) United States Patent
Hirono et al.

(10) Patent No.: US 6,225,383 B1
(45) Date of Patent: May 1, 2001

(54) RESIN COMPOSITION COMPRISING POLYAMIDE RESIN

(75) Inventors: Masaki Hirono; Noriyoshi Watanabe, both of Hiratsuka (JP)

(73) Assignee: Mitsubishi Engineering Plastic Corp. (JP)

(*) Notice: Subject to any disclaimer, the term of this patent is extended or adjusted under 35 U.S.C. 154(b) by 0 days.

(21) Appl. No.: 09/198,613

(22) Filed: Nov. 24, 1998

Related U.S. Application Data

(63) Continuation-in-part of application No. 09/083,429, filed on May 21, 1998, now abandoned.

(30) Foreign Application Priority Data

Oct. 14, 1998 (JP) .................................................. 10-292521
Oct. 14, 1998 (JP) .................................................. 10-292530

(51) Int. Cl.$^7$ ..................................................... C08K 5/34
(52) U.S. Cl. ............................................. 524/100; 524/80
(58) Field of Search ..................................... 524/100, 80

(56) References Cited

U.S. PATENT DOCUMENTS

| | | | |
|---|---|---|---|
| 3,660,344 | * 5/1972 | Michael et al. | 524/100 |
| 3,663,495 | * 5/1972 | Michael et al. | 524/100 |
| 4,197,235 | * 4/1980 | Nield et al. . | |
| 4,396,586 | * 8/1983 | Maurer et al. | 524/100 |
| 4,866,114 | * 9/1989 | Taubitz et al. | 524/100 |
| 5,344,931 | * 9/1994 | Cipolli et al. | 524/100 |

FOREIGN PATENT DOCUMENTS

| | | |
|---|---|---|
| 44 36 281 A1 | 4/1996 | (DE) . |
| 0 368 308 | 5/1990 | (EP) . |
| 0400600 | * 12/1990 | (EP) ............ 524/100 |
| 0 637 608 A2 | 2/1995 | (EP) . |
| WO 96/09344 | 3/1996 | (WO) . |

\* cited by examiner

Primary Examiner—Veronica P. Hoke
(74) Attorney, Agent, or Firm—Parkhurst & Wendel, L.L.P

(57) ABSTRACT

The present invention relates to a resin composition comprising:

100 parts by weight of resin component comprising a polyamide resin or a polyamide resin and a thermoplastic resin other than polyamide resins, and 1 to 50 parts by weight of a salt of polyphosphoric acid and melam or a melam derivative, a salt of polyphosphoric acid and melem or a melem derivative or a mixture thereof.

12 Claims, No Drawings

RESIN COMPOSITION COMPRISING POLYAMIDE RESIN

CROSS REFERENCE TO RELATED APPLICATION

This is a continuation-in-part application of U.S. patent application Ser. No. 09/083,429 filed May 21, 1998 now abandoned.

BACKGROUND OF THE INVENTION

The present invention relates a resin composition comprising a polyamide resin. Particularly, the present invention relates to a flame-retardant polyamide resin composition.

Several methods have been proposed for imparting flame-retardancy to polyamide resin compositions. In general, such method is to mix a flame retardant into polyamides. As the flame retardant used for this purpose, there are known, for example, halogen-based flame retardants, nitrogen-based compounds and metal-containing compounds. In case of using halogen-based flame retardants, however, there is a problem for safety of halogen-containing gases generated on combustion of the compounds. On the ether hand, the metal-containing compounds are unsatisfactory in their flame-retarding effect.

Regarding the nitrogen-based compounds, Japanese Patent Application Laid-Open (KQKAI) Nos. 50-105744 and 53-31759 teach a method for improving flame retardancy of polyamides by adding thereto melamine-, cyanuric acid or other triazine-based compounds such as melamine cyanurate. The method, however, still involved the problem that in case where an inorganic filler, especially a fibrous material such as glass fiber, is blended in polyamides, the filler may behave like a candlewick to adversely affect flame retardancy of polyamides. There has also been the of generating a "plateout" phenomenon in which the flame retardant sublimes in the molding article to deposit on the mold, causing sticking in the cavity or deteriorating of visual appearance of the molded article, or "blooming", i.e. a phenomenon in which part of the flame retardant separates out on the surface of the molded article.

Also, Japanese Patent Application Laid-Open (KOKAI) No. 53-49054 teaches a flame retardant composition in which melamine phosphate is blended. However, by mere addition of a salt of phosphoric acid and melamine, the mixing and extruding workability are rather deteriorated because of poor compatibility with polyamides to impair the visual appearance of the molded article.

Further, Japanese Patent Publication (KOKOKU) No. 61-49342 discloses a flame retardant composition prepared by blending melem or mellon (melem and mellon are calcined products of melamine to polyamide) to polyamide resin. Still further, Japanese Patent Application Laid-Open (KOHYO) No. 10-505875 (WO96/09344) discloses a flame retardant composition prepared by blending a reaction product of melem with phosphoric acid to polyamide. However, the above-mentioned flame retardant compositions are not sufficient in flame retardancy. Especially, in the flame retardant composition of Japanese Patent Application Laid-Open (KOHYO) No. 10-505875, the water absorbance property of the composition becomes high and the dispersibility to the polyamide becomes insufficient because of high water solubility due to the phosphate. As a result, the strength and elasticity thereof may be reduced. Further, the hot bend strength (temperature dependency of bending modulus) thereof may be reduced. Also, when the flame retardant compositions absorb water, reaction product of melem-phosphate is easily transferred to the surface of a molding product thereof, thereby deteriorating the surface appearance.

As a result of the present inventors' earnest studies to solve the above problems, it has been found that by blending (i) a salt of polyphosphoric acid and melam or a melam derivative, (ii) a salt of polyphosphoric acid and melem or a melem derivative, or (iii) mixture thereof with a polyamide resin, a polyamide resin composition has excellent thermal and mechanical properties as well as flame retardancy, and is also capable of providing the molded articles with excellent visual appearance. The present invention has been attained on the basis of the above finding.

SUMMARY OF THE INVENTION

The object of the present invention is to provide a polyamide resin composition having excellent thermal and mechanical properties and flame retardancy in addition to the excellent inherent properties of polyamides and also capable of providing the molded articles with excellent visual appearance.

To accomplish the aims mentioned above, in a first aspect of the present invention, there is provided a resin composition comprising:

100 parts by weight of resin component comprising a polyamide resin or a polyamide resin and a thermoplastic resin other than the polyamide resin, and 1 to 50 parts by weight of (i) a salt of polyphosphoric acid and melam or a melam derivative, (ii) a salt of polyphosphoric acid and melem or a melem derivative or (iii) a mixture thereof.

In a second aspect of the present invention, there is provided a resin composition comprising:

100 parts by weight of resin component comprising a polyamide resin or a polyamide resin and a thermoplastic resin other than the polyamide resin, 1 to 50 parts by weight of a salt of polyphosphoric acid and melam or a melam derivative, a salt of polyphosphoric acid and melem or a melem derivative or mixture thereof, and 0.1 to 20 parts by weight of a phosphoric flame retardant other than the salt of polyphosphoric acid and melam or a melam derivative, a salt of polyphosphoric acid and melem or a melem derivative or mixture thereof, and 0.1 to 300 parts by weight of an inorganic filler.

DETAILED DESCRIPTION OF THE INVENTION

The present invention is described in more detail as follows.

The resin component in the composition of the present invention comprises a polyamide resin alone or a polyamide resin and a thermoplastic resin other than polyamide resins. Examples of the polyamide resins usable in the present invention include, though not limited to, nylon 6, nylon 66, nylon 69, nylon 610, nylon 612, nylon 12, polyamide resins obtained from xylenediamine and x,o-linear aliphatic dibasic acids (these polyamide resins may hereinafter be referred to as MX nylon) and their mixtures. It is preferred to use MX nylon, or the mixtures of MX nylon, nylon 66 and/or nylon 6. The mixed resins comprising MX nylon and nylon 66 are more preferred.

In case where the mixed polyamide resin used is a resin comprising MX nylon, nylon 66 and/or nylon 6, the weight ratio of nylon 66 and/or nylon 6 to MX nylon is 0.1–100:100, preferably 0.1–80:100.

The thermoplastic resins other than the polyamide resins usable in the present invention include polystyrene resins, ABS resins, AES resins, AS resins, olefin resins, methacrylic resins, polycarbonate resins, polyacetal resins, polyphenylene ether resins (PPE resins), modified PPE resins, polyester resins, polysulfone resins, polyimide resins, polyphenylene sulfide resins, polyarylate resins, polyether sulfone resins, polyether ketone resins, polyether ether ketone resins, polyester carbonate resins, amorphous polyamide resins, liquid crystal polymers, and alloy resin compositions comprising two or more of these resins. Of these resins, polyphenylene ether resins (PPE resins) are preferred. If necessary, inorganic or organic fibrous filler, other types of filler, stabilizer, ultraviolet absorber, dye, pigment and other additives may be added to the composition.

In case where the resin component in the composition of the present invention comprises a polyamide resin and other thermoplastic resin, the weight ratio of the polyamide resin to the other thermoplastic resin preferably is 99/1 to 1/99, more preferably 90/10 to 10/90, even more preferably from 70/30 to 30/70.

The polyphenylene ether resins usable in the present invention are the polymers having the structural unit of the following formula (1) in the main chain, and they may be homopolymers, copolymers or graft polymers:

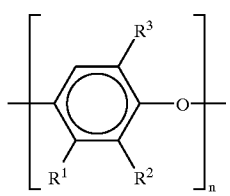

(1)

wherein $R^1$ is a lower alkyl group having 1 to 3 carbon atoms; $R^2$ and $R^3$ are each a hydrogen atom or a lower alkyl group having 1 to 3 carbon atoms; and n is a repeating number.

Typical examples of such polyphenylene ether resins are poly(2,6-dimethyl-1,4-phenylene) ether, poly(2,6-dimethyl-1,4-phenylene) ether, poly(2,6-dipropyl-1,4-phenylene) ether, poly(2-methyl-6-ethyl-1,4-phenylene) ether, and poly(2-methyl-6-propyl-1,4-phenylene) ether.

It is preferable to use poly(2,6-dimethyl-1,4-phenylene) ether, 2,6-dimethylphenol/ 2,3,6-trimethylphenol copolymer, and graft copolymers obtained by grafting styrene to these resins. It is more preferable to use the polyphenylene ether resins improved in compatibility (which may hereinafter be referred to as modified PPE). Such modified PPE can be obtained by reacting PPE with an unsaturated carboxylic acid or its anhydride.

In case where an unsaturated carboxylic acid anhydride is used for modifying PPE, it is possible to obtain modified PPE by non-catalytically reacting PPE with an unsaturated carboxylic acid anhydride in a molten and mixed state. In this case, any suitable means such as kneader, Banbury mixer, extruder, etc., may be used for effective melting and mixing of the said reactants, but use of an extruder is preferred because of the operational advantages. Examples of the unsaturated aliphatic carboxylic acid anhydrides usable in the present invention include maleic anhydride, itaconic anhydride, citraconic anhydride and the like. Of these, maleic anhydride is preferred.

The amount used of the acid anhydride for modifying PPE is usually 0.01 to 10 parts by weight, preferably 0.1 to 3 parts by weight, more preferably 0.1 to 1 part by weight based on 100 parts by weight of PPE. When the amount used of the acid anhydride is less than 0.01 part by weight, the tough composition may not be obtained because the improvement for compatibility of PPE and nylon is slight. When the amount used of the acid anhydride exceeds 10 parts by weight, there may be inconvenience for practical use such as deteriorating heat stability and its appearance because of the thermal decomposition of excess acid anhydride.

In case where an unsaturated aliphatic carboxylic acid is used for modifying PPE, a radical forming agent such as benzoyl peroxide, dicumyl peroxide or cumene hydroperoxide may be used as catalyst. The amount used of the unsaturated carboxylic acid for modifying PPE is usually 0.01 to 10 parts by weight based on 100 parts by weight of PPE.

As the salt of polyphosphoric acid and melam or a melam derivative, there can be used, for instance, the compounds represented by the following formula (2):

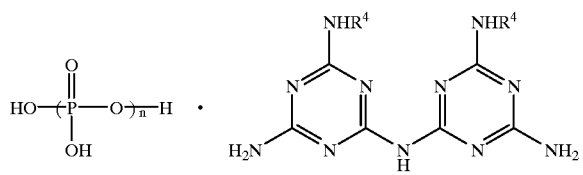

(2)

where n is a number of not less than 2 and $R^4$ represents a hydrogen atom, a cyano group or a guanyl group, preferably a hydrogen atom.

The salt of polyphosphoric acid and melam or a melam derivative is obtained by the following method. For example, a salt obtained from a neutralization reaction of phosphoric acid with melamine or a melamine derivative is calcined at 300° C. to 400° C. for several hours to prepare the salt.

In the present invention, a salt of polyphosphoric acid and melem or a melem derivative (hereinafter, abbreviated to melem polyphosphate) is represented by the following formula (3):

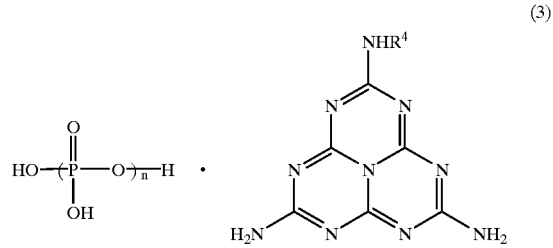

(3)

where n is a number of not less than 2 and $R^4$ represents a hydrogen atom, a cyano group or a guanyl group, preferably a hydrogen atom.

The melem polyphosphate is produced by calcining at 400 to 500° C. for few hours. The salt is obtained by neutralization of phosphoric acid and melem or a melem derivative.

According to the condition of the above calcinations for producing the salt of polyphosphoric acid and melam or a melam derivative or the salt of polyphosphoric acid and melem or a melem derivative, such as calcination time and calcination temperature, there may be produced a mixture of the salt of polyphosphoric acid and melam or a melam derivative and the salt of polyphosphoric acid and melem or a melem derivative.

In the present invention, the mixture of the salt of polyphosphoric acid and melam or a melam derivative and the salt of polyphosphoric acid and melem or a melem derivative can be used. The weight ratio of melam or a melam derivative to melem or a melem derivative is usually less than 90/10 and not less than 5/95, preferably 75/25 to 5/95. From the view point of easy industrial productivity, the above mentioned ratio is especially preferably 50/50 to 5/95. The above each product is a white solid, which is usually finely powdered for use.

The phosphorus content in the salt of polyphosphoric acid and melam or a melam derivative, the salt of polyphosphoric acid and melem or a melem derivative or mixture thereof is preferably 5 to 15% by weight. If the phosphorus content is less than 5% by weight, the produced composition may be unsatisfactory in flame retardancy. In the phosphorus content exceeds 15% by weight, the hygroscopicity of the produced composition may be elevated. The preferred range of phosphorus content in the salt of polyphosphoric acid and melam or a melam derivative, the salt of polyphosphoric acid and melem or a melem derivative or mixture thereof is from 7 to 12% by weight.

The average particle diameter of the salt of polyphosphoric acid and melam or a melam derivative, the salt of polyphosphoric acid and melem or a melem derivative or mixture thereof is preferably not more than 50 $\mu$m, more preferably 0.1 to 30 $\mu$m. If the average particle diameter exceeds 50 $\mu$m, dispersibility of the salt in the polyamide resin may lower, which tends to affect visual appearance of the molded article.

Examples of the salt of polyphosphoric acid and melam or a melam derivative usable in the present invention include melam polyphosphate, cyanomelam polyphosphate and guanylmelam polyphosphate. Of these, melam polyphosphate is preferred.

Examples of the melem polyphosphate usable in the present invention include melem polyphosphate, cyanomelem polyphosphate and guanylmelem polyphosphate. Of these, melem polyphosphate is preferred because of the easily industrial production. Examples of the melem polyphosphate include the melem polyphosphate corresponding to the above melam polyphosphate.

Generally, the melam and melam derivatives, melem or melem derivative and the mixture thereof are more excellent in heat stability than melamine, and the decomposition temperature of the melam and melam derivatives, melem or melem derivative and the mixture thereof is not less than 450° C. Therefore, the sublimation of the melam and melam derivatives, melem or melem derivative and the mixture thereof hardly proceeds even at the molding temperature of polyamide resin.

As phosphoric acid for producing polyphosphate, it is possible to use the commonly known ones such as orthophosphoric acid, etc. Of these, orthophosphoric acid is preferred because it is capable of mass production in industrial terms. It is also preferable to substitute part of orthophosphoric acid with a condensed phosphoric acid such as pyrophosphoric acid or metaphosphoric acid for improving water solubility of orthophosphoric acid or hygroscopicity of the composition.

The content of the salt of polyphosphoric acid and melam or a melam derivative, the salt of polyphosphoric acid and melem or a melem derivative or mixture thereof is usually 1 to 50 parts by weight, preferably 2 to 40 parts by weight, more preferably 3 to 30 parts by weight based on 100 parts by weight of the resin component. If the content of the salt is less than one part by weight, the desired flame retardancy may not be obtained, while if the salt content exceeds 50 parts by weight, the mechanical properties of the obtained composition may be unsatisfactory.

As the inorganic filler, it is possible to use the known inorganic fillers. The shape of the filler used is not subject to any specific restrictions and it may, for instance, be fibrous, plate-like, needle-like, spherical or powdery. Examples of the inorganic fillers usable in the present invention are glass fiber, carbon fiber, talc, mica, glass flakes, wollastonite, potassium titanate, magnesium sulfate, sepiolite, xonotlite, aluminum borate, glass beads, balloon, calcium carbonate, kaolin, clay, titanium oxide, barium sulfate, zinc oxide, and magnesium hydroxide. These inorganic fillers may be used either singly or as a mixture of two or more of them. Of these, glass fiber, talc and calcium carbonate are preferred.

The amount of the inorganic filler used in the present invention is 0 to 300 parts by weight, preferably 5 to 300 parts by weight based on 100 parts by weight of the resin component. When the amount of the inorganic filler blended exceeds 300 parts by weight, the obtained composition may be deteriorated in workability. The more preferred range of the amount of the inorganic filler blended is 10 to 250 parts by weight, even more preferably 50 to 150 parts by weight, based on 100 parts by weight of the resin component.

In order to enhance flame retardancy of the resin composition of the present invention, it is preferred to further add a phosphoric flame retardant other than the salt of polyphosphoric acid and melam or a melam derivative, the salt of polyphosphoric acid and melem or a melem derivative or mixture thereof. The phosphoric flame retardants other than the said salts usable in the present invention include organic phosphoric compounds, red phosphorus, phosphazene-based compounds, ammonium polyphosphate, melamine polyphosphate and the like.

The organic phosphoric compounds include phosphates represented by triphenyl phosphate and phosphites represented by triphenyl phosphite. More specifically, they include phosphoric esters such as triphenyl phosphate, trithiophenyl phosphate, trixylenyl phosphate, hydroquinonebis(diphenyl phosphate) and resorcinolbis (diphenyl phosphate), and condensed phosphoric esters such as phenylresolcine polyphosphate and resorcinol polyphosphate.

Red phosphorus is one of the allotropies of phosphorus. Generally, it is amorphous and a rubiginous solid with a density of about 2.1 to 2.3. It can be obtained, for instance, by heating yellow phosphorus in an inert gas.

The phosphazene-based compounds usable in the present invention include the phosphenitrile derivatives having the following structure:

(4)

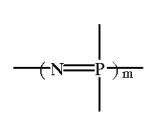

wherein m is the number of the repeating units. Examples of such derivatives are propoxyphosphazene oligomers and phosphenylphosphazene oligomers.

In the present invention, a phosphoric flame retardant having a percentage of loss in weight on heating of not more than 2% by weight in differential thermal analysis at 250° C. is preferred so as to achieve low gas generation and low blooming generation during molding.

Preferred examples of the phosphoric flame retardant for use in the present invention are ammonium polyphosphate, polyphosphate, red phosphorus, and condensed phosphoric esters. Of these, red phosphorus and condensed phosphoric esters are preferred in terms of heat resistance and availability. These phosphoric flame retardants may be used either singly or as a mixture of two or more of them.

The content of the phosphoric flame retardant other than the salts of polyphosphoric acid and melam or a melam derivative, the salt of polyphosphoric acid and melem or a melem derivative or mixture thereof, used in the present invention is usually 0.1 to 20 parts by weight, preferably 0.2 to 15 parts by weight, more preferably 0.3 to 10 parts by weight based on 100 parts by weight of the resin component. If the content of the said flame retardant is less than the above-defined range, the desired flame retarding effect may not be obtained, and if the flame retardant content exceeds the above-defined range, there may take place excessive tinting of the molded article and/or blooming of the flame retardant.

In the polyamide resin composition according to the present invention, it is possible to properly blend, in addition to the said components, various types of additives commonly used in the high polymeric materials, such as stabilizer, dye or pigment, release agent, lubricant, nucleating agent, weather resistance improver, etc. The amount of these additives blended is usually not more than 30 parts by weight based on 100 parts by weight of the resin component.

The ordinary methods may be used for producing the polyamide resin composition of the present invention. For example, a method may be used in which a polyamide resin, a thermoplastic resin other than the polyamide resins, a salt of polyphosphoric acid and melam or a melam derivative, a salt of polyphosphoric acid and melem or a melem derivative or mixture thereof, and if necessary, an inorganic filler, a phosphoric flame retardant and other additives are melted and mixed in an optional order by a commonly used apparatus such as a vented extruder.

The polyamide resin composition of the present invention has excellent thermal and mechanical properties and flame retardancy in addition to the inherent properties of polyamides and is capable of providing the molded articles with excellent visual appearance. The present resin composition is also advantageous in safety of the gas generated on combustion and can be utilized for making various types of molded article. As the composition has excellent mechanical properties, especially in bending strength and flexural modulus, that enable metal substitution, it can be applied to the machine parts that are required to have high mechanical properties, such as OA apparatus. Further, the polyamide resin composition of the present invention has excellent anti-mold contamination properties and moldability, so that it can be advantageously used for producing various types of molded articles.

EXAMPLES

The present invention is described in further detail below with reference to the examples thereof, but it should be understood that these examples are merely intended to be illustrative and not to be construed as limiting the scope of the invention.

The following materials were used in the Examples and Comparative Examples.
(1) Nylon MXD6: poly(meta-xylyleneadipamide) produced by Mitsubishi Gas Chemical Co., Ltd.; relative viscosity= 2.14 (measured at 25° C. using 98% sulfuric acid as solvent).
(2) Nylon 66-(A): relative viscosity=2.25
(3) Nylon 66-(B): relative viscosity=2.95
(4) Nylon 6-(A): relative viscosity=2.30
(5) Nylon 6-(B): relative viscosity=2.20
(6) Modified PPE: obtained by adding 50 g of maleic anhydride to 5 kg of PPE (produced by Mitsubishi Gas Chemical Co., Ltd.; intrinsic viscosity=4.45), mixing them by a supermixer for 3 minutes, and melting and kneading the mixture under heating at 300° C. by a twin-screw extruder to obtain maleic anhydride-modified PPE.
(7) Glass fiber: 3 mm long chopped strand; trade name CS03-JAFT2, produced by Asahi Fiber Glass Co., Ltd.
(8) Calcium carbonate: trade name NS-100, produced by Nitto Funka Kogyo KK.
(9) Melam polyphosphate: phosphorus content=9.8 wt %; average particle diameter=1.8 μm, produced by Nissan Chemical Industries Co., Ltd.
(10) Melem polyphosphate: phosphorus content=12.6 wt %; average particle diameter=8.6 μm, produced by calcining a salt at 400° C. for 3 hours, which salt was obtained by neutralizing melamine with orthophosphoric acid (1/1 molar ratio).
(11) Melem/melam polyphosphate mixture produced by Nissan Chemical Industries Co., Ltd, shown in the following Table 1

TABLE 1

|  | Content of P (weight %) | Average particle diameter (μm) | Composition (weight %) | | |
| --- | --- | --- | --- | --- | --- |
|  |  |  | melamine | melam | melem |
| Flame retardant (a) | 11.4 | 6.7 | 17 | 63 | 20 |
| Flame retardant (b) | 12.5 | 10.0 | 4 | 23 | 73 |
| Flame retardant (c) | 12.2 | 9.6 | 0.7 | 8.3 | 91 |
| Flame retardant (d) | 12 | 10 | — | 90 | 10 |

(12) Red phosphorus: trade name Hishiguard TP-10, produced by Nippon Chemical Industries Co., Ltd.
(13) Condensed phosphoric ester: trade name PX-200, produced by Daihachi Chemical Industries Co., Ltd.
(14) Flame retardant (e): melamine phosphate produced by Nissan Chemical Industries Co., Ltd.
(15) Flame retardant (f): melamine cyanurate, trade name MC440, produced by Nissan Chemical Industries Co., Ltd.
(16) Flame retardant (g): magnesium hydroxide, trade name Kisuma 5E, produced by Kyowa Chemical Co., Ltd.

In the Examples and Comparative Examples, the bending strength, flexural modulus, combustibility test and anti-mold contamination test were conducted in the manner described below.

Flame retardancy:

5×½×1/16 inch combustion test pieces were molded from the resin composition using an injection molder at a resin temperature of 260° C. and a mold temperature of 130° C. Flame retardancy was determined by subjecting these test pieces to a test according to the Subject 94 (UL-94) Standards laid down by Underwriters Laboratory, U.S. In the present invention, it is preferred that the flame retardancy is V-1 or more excellent grade.

Bending strength and flexural modulus:

5×½×¼ inch test pieces were molded from the resin composition at a resin temperature of 260° C. and a mold temperature of 130° C. Bending strength and flexural modulus were determined according to ASTM D-790.

Anti-mold contamination test:

1.5 inch φ discs were molded by short shot molding with continuous 100 shots under the following conditions: primary injection pressure=500 kgf/cm$^2$; injection speed=20 mm/s; dwell=0 kgf/cm$^2$; injection time=3 sec.; molding temperature=270° C.; mold temperature=130° C.; cooling time=8 sec. The mold surface after molding was visually observed with naked eye, and the condition of the mold surface was examined and rated according to the following 4-grade system:

⊚: Almost no mold contamination occurred.

○: A slight degree of mold contamination occurred.

Δ: Mold contamination occurred.

×: Heavy mold contamination occurred.

In the present invention, it is preferred that anti-mold contamination is ⊚ or ○ grade.

Examples 1–15 and Comparative Examples 1–10

The measured amounts (shown in Table 1) of nylon MXD6, nylon 66, nylon 6, modified PPE, glass fiber, calcium carbonate, melam polyphosphate, red phosphorus, condensed phosphoric ester and flame retardants a–c were mixed by a tumbler, the mixture was melted and kneaded at 270° C. and extruded into a string by a vented extruder, and the extrudate was cooled in a water tank, cut and dried to obtain pellets. The results of evaluation of the obtained materials are shown in Table 1.

TABLE 1

|  | Example 1 | Example 2 | Comp. Example 1 | Comp. Example 2 |
|---|---|---|---|---|
| Feed (weight part) |  |  |  |  |
| Nylon MXD6 | 100 | 100 | 100 | 100 |
| Nylon 66-(A) | 11 | 11 | 11 | 11 |
| Nylon 6-(A) | — | — | — | — |
| Modified PPE | — | — | — | — |
| Glass fiber | 111 | 111 | 111 | 111 |
| Calcium carbonate | — | — | — | — |
| Melam polyphosphate | 13 | 22 | — | — |
| Red phosphorus | — | — | — | — |
| Condensed phosphate | — | — | — | — |
| Flame retardant e | — | — | — | 13 |
| Flame retardant f | — | — | — | — |
| Flame retardant g | — | — | — | — |
| Properties |  |  |  |  |
| Bending modulus (kgf/cm$^2$) | 3300 | 3200 | 3600 | 3280 |
| Flexural modulus (× 10$^3$ kgf/cm$^2$) | 171 | 167 | 178 | 170 |
| Flammability (1/16 inch, UL94) | V-1 | V-0 | HB | V-0 |
| Anti-mold contamination | ⊚ | ○ | ⊚ | Δ |

|  | Comp. Example 3 | Comp. Example 4 | Example 3 | Example 4 |
|---|---|---|---|---|
| Feed (weight part) |  |  |  |  |
| Nylon MXD6 | 100 | 100 | 100 | 100 |
| Nylon 66-(A) | 11 | 11 | 40 | 40 |
| Nylon 6-(A) | — | — | 60 | 60 |

TABLE 1-continued

| Modified PPE | — | — | — | — |
|---|---|---|---|---|
| Glass fiber | 111 | 111 | 120 | 120 |
| Calcium carbonate | — | — | 80 | 80 |
| Melam polyphosphate | — | — | 40 | 60 |
| Red phosphorus | — | — | — | — |
| Condensed phosphate | — | — | — | — |
| Flame retardant e | — | — | — | — |
| Flame retardant f | 44 | — | — | — |
| Flame retardant g | — | 44 | — | — |
| Properties |  |  |  |  |
| Bending strength (kgf/cm$^2$) | 2920 | 2710 | 2350 | 2280 |
| Flexural modulus (× 10$^3$ kgf/cm$^2$) | 156 | 183 | 125 | 120 |
| Flammability (1/16 inch, UL94) | HB | HB | V-1 | V-0 |
| Anti-mold contamination | × | Δ | ⊚ | ○ |

|  | Comp. Example 5 | Comp. Example 6 | Comp. Example 7 | Example 5 |
|---|---|---|---|---|
| Feed (weight part) |  |  |  |  |
| Nylon MXD6 | 100 | 100 | 100 | 100 |
| Nylon 66-(A) | 40 | 40 | 40 | 17 |
| Nylon 6-(A) | 60 | 60 | 60 | — |
| Modified PPE | — | — | — | 117 |
| Glass fiber | 120 | 120 | 120 | 100 |
| Calcium carbonate | 80 | 80 | 80 | — |
| Melam polyphosphate | — | — | — | 17 |
| Red phosphorus | — | — | — | — |
| Condensed phosphate | — | — | — | — |
| Flame retardant e | 40 | — | — | — |
| Flame retardant f | — | 80 | — | — |
| Flame retardant g | — | — | 80 | — |
| Properties |  |  |  |  |
| Bending strength (kgf/cm$^2$) | 2320 | 2110 | 1970 | 2330 |
| Flexural modulus (× 10$^3$ kgf/cm$^2$) | 124 | 118 | 138 | 88 |
| Flammability (1/16 inch, UL94) | V-0 | HB | HB | V-1 |
| Anti-mold contamination | × | × | Δ | ⊚ |

|  | Example 6 | Comp. Example 8 | Comp. Example 9 | Comp. Example 10 |
|---|---|---|---|---|
| Feed (weight part) |  |  |  |  |
| Nylon MXD6 | 100 | 100 | 100 | 100 |
| Nylon 66-(A) | 17 | 17 | 17 | 17 |
| Nylon 6-(A) | — | — | — | — |
| Modified PPE | 117 | 117 | 117 | 117 |
| Glass fiber | 100 | 100 | 100 | 100 |
| Calcium carbonate | — | — | — | — |
| Melam polyphosphate | 30 | — | — | — |
| Red phosphorus | — | — | — | — |
| Condensed phosphate | — | — | — | — |
| Flame retardant e | — | 17 | — | — |
| Flame retardant f | — | — | 67 | — |
| Flame retardant g | — | — | — | 67 |
| Properties |  |  |  |  |
| Bending strength (kgf/cm$^2$) | 2250 | 2310 | 1950 | 1870 |
| Flexural modulus (× 10$^3$ kgf/cm$^2$) | 86 | 88 | 83 | 96 |
| Flammability (1/16 inch, UL94) | V-0 | V-1 | HB | HB |
| Anti-mold contamination | ○ | Δ | × | Δ |

TABLE 1-continued

|  | Example 7 | Example 8 | Example 9 | Example 10 |
|---|---|---|---|---|
| Feed (weight part) | | | | |
| Nylon MXD6 | 100 | 100 | 100 | 100 |
| Nylon 66-(A) | 11 | 11 | 11 | 20 |
| Nylon 6-(A) | — | — | — | 40 |
| Modified PPE | — | — | — | — |
| Glass fiber | 111 | 111 | 111 | 160 |
| Calcium carbonate | — | — | — | 60 |
| Melam polyphosphate | 7 | 11 | 10 | 20 |
| Red phosphorus | 1.3 | 1 | — | 4 |
| Condensed phosphate | — | — | 6 | — |
| Flame retardant e | — | — | — | — |
| Flame retardant f | — | — | — | — |
| Flame retardant g | — | — | — | — |
| Properties | | | | |
| Bending strength (kgf/cm$^2$) | 3460 | 3320 | 3100 | 2600 |
| Flexural modulus (× 10$^3$ kgf/cm$^2$) | 175 | 173 | 168 | 158 |
| Flammability (1/16 inch, UL94) | V-0 | V-0 | V-0 | V-0 |
| Anti-mold contamination | ◎ | ◎ | ◎ | ◎ |

|  | Example 11 | Example 12 | Example 13 |
|---|---|---|---|
| Feed (weight part) | | | |
| Nylon MXD6 | 100 | 100 | 100 |
| Nylon 66-(A) | 20 | 20 | 17 |
| Nylon 6-(A) | 40 | 40 | — |
| Modified PPE | — | — | 117 |
| Glass fiber | 160 | 160 | 100 |
| Calcium carbonate | 60 | 60 | — |
| Melam polyphosphate | 32 | 30 | 10 |
| Red phosphorus | 3 | — | 2 |
| Condensed phosphate | — | 15 | — |
| Flame retardant a | — | — | — |
| Flame retardant b | — | — | — |
| Flame retardant c | — | — | — |
| Properties | | | |
| Bending strength (kgf/cm$^2$) | 2430 | 2200 | 2460 |
| Flexural modulus (× 10$^3$ kgf/cm$^2$) | 155 | 152 | 93 |
| Flammability (1/16 inch, UL94) | V-0 | V-0 | V-0 |
| Anti-mold contamination | ◎ | ◎ | ◎ |

|  | Example 14 | Example 15 |
|---|---|---|
| Feed (weight part) | | |
| Nylon MXD6 | 100 | 100 |
| Nylon 66-(A) | 17 | 17 |
| Nylon 6-(A) | — | — |
| Modified PPE | 117 | 117 |
| Glass fiber | 100 | 100 |
| Calcium carbonate | — | — |
| Melam polyphosphate | 15 | 14 |
| Red phosphorus | 1.5 | — |
| Condensed phosphate | — | 7 |
| Flame retardant e | — | — |
| Flame retardant f | — | — |
| Flame retardant g | — | — |
| Properties | | |
| Bending strength (kgf/cm$^2$) | 2400 | 2250 |
| Flexural modulus (× 10$^3$ kgf/cm$^2$) | 90 | 87 |
| Flammability (1/16 inch, UL94) | V-0 | V-0 |
| Anti-mold contamination | ◎ | ◎ |

Examples 16–19

The measured amounts (shown in Table 2) of nylon MXD6, nylon 66, nylon 6, modified PPE, glass fiber, calcium carbonate, melam/melem-polyphosphate, red phosphorus, and condensed phosphoric ester were mixed by a tumbler, the mixture was melted and kneaded at 270° C. and extruded into a string by a vented extruder, and the extrudate was cooled in a water tank, cut and dried to obtain pellets. The results of evaluation of the obtained materials are shown in Table 2.

TABLE 2

|  | Example 16 | Example 17 | Example 18 | Example 19 |
|---|---|---|---|---|
| Feed (weight part) | | | | |
| Nylon MXD6 | 100 | 100 | 100 | 100 |
| Nylon 66-(A) | 11 | 11 | 20 | 17 |
| Nylon 6-(A) | — | — | 40 | — |
| Modified PPE | — | — | — | 117 |
| Glass fiber | 111 | 111 | 160 | 100 |
| Calcium carbonate | — | — | — | — |
| Flame retardant d | 7 | 10 | 18 | 11 |
| Red phosphorus | 1.1 | — | 4 | 2 |
| Condensed phosphate | — | 7 | — | — |
| Properties | | | | |
| Bending strength (kgf/cm$^2$) | 3450 | 3150 | 2650 | 2440 |
| Flexural modulus (× 10$^3$ kgf/cm$^2$) | 171 | 167 | 160 | 91 |
| Flammability (1/16 inch, UL94) | V-0 | V-0 | V-0 | V-0 |
| Anti-mold contamination | ◎ | ◎ | ◎ | ◎ |

Examples 20–22

The measured amounts (shown in Table 3) of nylon MXD6, nylon 66, nylon 6, modified PPE, glass fiber and melam/melem-polyphosphate were mixed by a tumbler, the mixture was melted and kneaded at 270° C. and extruded into a string by a vented extruder, and the extrudate was cooled in a water tank, cut and dried to obtain pellets. The results of evaluation of the obtained materials are shown in Table 3.

TABLE 3

|  | Example 20 | Example 21 | Example 22 |
|---|---|---|---|
| Feed (weight part) | | | |
| Nylon MXD6 | 100 | 100 | 100 |
| Nylon 66-(A) | 11 | 20 | 17 |
| Nylon 6-(A) | — | 40 | — |
| Modified PPE | — | — | 117 |
| Glass fiber | 111 | 160 | 100 |
| Calcium carbonate | — | — | — |
| Flame retardant d | 18 | 54 | 26 |

TABLE 3-continued

| Properties | Example 20 | Example 21 | Example 22 |
|---|---|---|---|
| Bending strength (kgf/cm$^2$) | 3240 | 2320 | 2300 |
| Flexural modulus (× 10$^3$ kgf/cm$^2$) | 169 | 122 | 87 |
| Flammability (1/16 inch, UL94) | V-0 | V-0 | V-0 |
| Anti-mold contamination | ◉ | ◉ | ◉ |

Examples 23–31 and Comparative Examples 11–22

The measured amounts of each material (shown in Table 4) were mixed by a tumbler, the mixture was melted and kneaded at 270° C. and extruded into a string by a vented extruder, and the extrudate was cooled in a water tank, cut and dried to obtain pellets. The results of evaluation of the obtained materials are shown in Table 4.

TABLE 4

| | Example 23 | Example 24 | Example 25 | Comp. Example 11 |
|---|---|---|---|---|
| Feed (weight part) | | | | |
| Nylon MXD6 | 100 | 100 | 100 | 100 |
| Nylon 66-(B) | 11 | 11 | 11 | 11 |
| Nylon 6-(B) | — | — | — | — |
| Modified PPE | — | — | — | — |
| Glass fiber | 111 | 111 | 111 | 111 |
| Calcium carbonate | — | — | — | — |
| Melem polyphosphate | 22 | 6 | 6 | — |
| Melem | — | — | — | — |
| Red phosphorus | — | 1.1 | — | — |
| Condensed phosphate | — | — | 8 | — |
| Melamine cyanurate | — | — | — | 40 |
| Magnesium hydroxide | — | — | — | — |
| Properties | | | | |
| Bending strength (kgf/cm$^2$) | 3150 | 3350 | 3100 | 2940 |
| Flexural modulus (× 10$^3$ kgf/cm$^2$) | 167 | 173 | 166 | 156 |
| Flammability (1/16 inch, UL94) | V-0 | V-0 | V-0 | HB |
| Anti-mold contamination | ○ | ◉ | ◉ | X |

| | Comp. Example 12 | Comp. Example 13 | Comp. Example 14 | Example 26 |
|---|---|---|---|---|
| Feed (weight part) | | | | |
| Nylon MXD6 | 100 | 100 | 100 | 100 |
| Nylon 66-(B) | 11 | 11 | 11 | 20 |
| Nylon 6-(B) | — | — | — | 40 |
| Modified PPE | — | — | — | — |
| Glass fiber | 111 | 111 | 111 | 160 |
| Calcium carbonate | — | — | — | 60 |
| Melem polyphosphate | — | — | — | 60 |
| Melem | — | 6 | 40 | — |
| Red phosphorus | — | 2.2 | — | — |
| Condensed phosphate | — | — | — | — |
| Melamine cyanurate | — | — | — | — |
| Magnesium hydroxide | 40 | — | — | — |
| Properties | | | | |
| Bending strength (kgf/cm$^2$) | 2760 | 3200 | 2930 | 2320 |
| Flexural modulus (× 10$^3$ kgf/cm$^2$) | 182 | 167 | 156 | 154 |
| Flammability (1/16 inch, UL94) | HB | V-1 | UB | V-0 |
| Anti-mold contamination | Δ | ○ | ○ | ○ |

| | Example 27 | Example 28 | Comp. Example 15 | Comp. Example 16 |
|---|---|---|---|---|
| Feed (weight part) | | | | |
| Nylon MXD6 | 100 | 100 | 100 | 100 |
| Nylon 66-(B) | 20 | 20 | 20 | 20 |
| Nylon 6-(B) | 40 | 40 | 40 | 40 |
| Modified PPE | — | — | — | — |
| Glass fiber | 160 | 160 | 160 | 160 |
| Calcium carbonate | 60 | 60 | 60 | 60 |
| Melem polyphosphate | 20 | 30 | — | — |
| Melem | — | — | — | — |
| Red phosphorus | 4 | — | — | — |
| Condensed phosphate | — | 15 | — | — |
| Melamine cyanurate | — | — | 60 | — |
| Magnesium hydroxide | — | — | — | 60 |
| Properties | | | | |
| Bending strength (kgf/cm$^2$) | 2610 | 2250 | 1940 | 1830 |
| Flexural modulus (× 10$^3$ kgf/cm$^2$) | 156 | 153 | 141 | 162 |
| Flammability (1/16 inch, UL94) | V-0 | V-0 | HB | HB |
| Anti-mold contamination | ◉ | ◉ | X | Δ |

| | Comp. Example 17 | Comp. Example 18 | Example 29 | Example 30 |
|---|---|---|---|---|
| Feed (weight part) | | | | |
| Nylon MXD6 | 100 | 100 | 100 | 100 |
| Nylon 66-(B) | 20 | 20 | 11 | 11 |
| Nylon 6-(B) | 40 | 40 | — | — |
| Modified PPE | — | — | 117 | 117 |
| Glass fiber | 160 | 160 | 100 | 100 |
| Calcium carbonate | 60 | 60 | — | — |
| Melem polyphosphate | — | — | 27 | 11 |
| Melem | 20 | 60 | — | — |
| Red phosphorus | 6 | — | — | 2 |
| Condensed phosphate | — | — | — | — |
| Melamine cyanurate | — | — | — | — |
| Magnesium hydroxide | — | — | — | — |
| Properties | | | | |
| Bending strength (kgf/cm$^2$) | 2450 | 1950 | 2290 | 2430 |
| Flexural modulus (× 10$^3$ kgf/cm$^2$) | 153 | 142 | 87 | 91 |
| Flammability (1/16 inch, UL94) | V-1 | HB | V-0 | V-0 |
| Anti-mold contamination | ○ | ○ | ○ | ◉ |

| | Example 31 | Comp. Example 19 | Comp. Example 20 |
|---|---|---|---|
| Feed (weight part) | | | |
| Nylon MXD6 | 100 | 100 | 100 |
| Nylon 66-(B) | 11 | 11 | 11 |
| Nylon 6-(B) | — | — | — |
| Modified PPE | 117 | 117 | 117 |
| Glass fiber | 100 | 100 | 100 |

TABLE 4-continued

|  |  |  |  |
|---|---|---|---|
| Calcium carbonate | — | — | — |
| Melem polyphosphate | 14 | — | — |
| Melem | — | — | — |
| Red phosphorus | — | — | — |
| Condensed phosphate | 10 | — | — |
| Melamine cyanurate | — | 67 | — |
| Magnesium hydroxide | — | — | 67 |
| Properties |  |  |  |
| Bending strength (kgf/cm$^2$) | 2250 | 1920 | 1880 |
| Flexural modulus (× 10$^3$ kgf/cm$^2$) | 85 | 81 | 95 |
| Flammability (1/16 inch, UL94) | V-0 | HB | HB |
| Anti-mold contamination | ◉ | X | △ |

|  | Comp. Example 21 | Comp. Example 22 |
|---|---|---|
| Feed (weight part) |  |  |
| Nylon MXD6 | 100 | 100 |
| Nylon 66-(B) | 11 | 11 |
| Nylon 6-(B) | — | — |
| Modified PPE | 117 | 117 |
| Glass fiber | 100 | 100 |
| Calcium carbonate | — | — |
| Melem polyphosphate | — | — |
| Melem | 11 | 67 |
| Red phosphorus | 4 | — |
| Condensed phosphate | — | — |
| Melamine cyanurate | — | — |
| Magnesium hydroxide | — | — |
| Properties |  |  |
| Bending strength (kgf/cm$^2$) | 2350 | 1930 |
| Flexural modulus (× 10$^3$ kgf/cm$^2$) | 89 | 82 |
| Flammability (1/16 inch, UL94) | V-1 | HB |
| Anti-mold contamination | ○ | ○ |

Examples 32–46

The measured amounts of each material (shown in Table 5) were mixed by a tumbler, the mixture was melted and kneaded at 270° C. and extruded into a string by a vented extruder, and the extrudate was cooled in a water tank, cut and dried to obtain pellets. The results of evaluation of the obtained materials are shown in Table 5.

TABLE 5

|  | Example 32 | Example 33 | Example 34 | Example 35 |
|---|---|---|---|---|
| Feed (weight part) |  |  |  |  |
| Nylon MXD6 | 100 | 100 | 100 | 100 |
| Nylon 66-(B) | 11 | 11 | 11 | 11 |
| Nylon 6-(B) | — | — | — | — |
| Modified PPE | — | — | — | — |
| Glass fiber | 111 | 111 | 111 | 111 |
| Calcium carbonate | — | — | — | — |
| Flame retardant (a) | 22 | 6 | 6 | — |
| Flame retardant (b) | — | — | — | 6 |
| Flame retardant (c) | — | — | — | — |
| Melem | — | — | — | — |
| Red phosphorus | — | 1.1 | — | 1.1 |
| Condensed phosphate | — | — | 9 | — |
| Melamine cyanurate | — | — | — | — |
| Magnesium hydroxide | — | — | — | — |
| Properties |  |  |  |  |
| Bending strength (kgf/cm$^2$) | 3150 | 3380 | 3160 | 3350 |
| Flexural modulus (× 10$^3$ kgf/cm$^2$) | 160 | 166 | 155 | 165 |
| Flammability (1/16 inch, UL94) | V-0 | V-0 | V-0 | V-0 |
| Anti-mold contamination | ○ | ◉ | ◉ | ◉ |

|  | Example 36 | Example 37 | Example 38 | Example 39 |
|---|---|---|---|---|
| Feed (weight part) |  |  |  |  |
| Nylon MXD6 | 100 | 100 | 100 | 100 |
| Nylon 66-(B) | 11 | 20 | 20 | 20 |
| Nylon 6-(B) | — | 40 | 40 | 40 |
| Modified PPE | — | — | — | — |
| Glass fiber | 111 | 160 | 160 | 160 |
| Calcium carbonate | — | 60 | 60 | 60 |
| Flame retardant (a) | — | 60 | 20 | 30 |
| Flame retardant (b) | — | — | — | — |
| Flame retardant (c) | 6 | — | — | — |
| Melem | — | — | — | — |
| Red phosphorus | 1.1 | — | 4 | — |
| Condensed phosphate | — | — | — | 20 |
| Melamine cyanurate | — | — | — | — |
| Magnesium hydroxide | — | — | — | — |
| Properties |  |  |  |  |
| Bending strength (kgf/cm$^2$) | 3340 | 2320 | 2610 | 2250 |
| Flexural modulus (× 10$^3$ kgf/cm$^2$) | 165 | 154 | 156 | 150 |
| Flammability (1/16 inch, UL94) | V-0 | V-0 | V-0 | V-0 |
| Anti-mold contamination | ◉ | ○ | ◉ | ◉ |

|  | Example 40 | Example 41 | Example 42 | Example 43 |
|---|---|---|---|---|
| Feed (weight part) |  |  |  |  |
| Nylon MXD6 | 100 | 100 | 100 | 100 |
| Nylon 66-(B) | 20 | 20 | 11 | 11 |
| Nylon 6-(B) | 40 | 40 | — | — |
| Modified PPE | — | — | 117 | 117 |
| Glass fiber | 160 | 160 | 100 | 100 |
| Calcium carbonate | 60 | 60 | — | — |
| Flame retardant (a) | — | — | 27 | 11 |
| Flame retardant (b) | 20 | — | — | — |
| Flame retardant (c) | — | 20 | — | — |
| Melem | — | — | — | — |
| Red phosphorus | 4 | 4 | — | 2 |
| Condensed phosphate | — | — | — | — |
| Melamine cyanurate | — | — | — | — |
| Magnesium hydroxide | — | — | — | — |
| Properties |  |  |  |  |
| Bending strength (kgf/cm$^2$) | 2590 | 2580 | 2260 | 2400 |
| Flexural modulus (× 10$^3$ kgf/cm$^2$) | 155 | 155 | 85 | 91 |
| Flammability (1/16 inch, UL94) | V-0 | V-0 | V-0 | V-0 |
| Anti-mold contamination | ◉ | ◉ | ○ | ◉ |

TABLE 5-continued

| | Example 44 | Example 45 | Example 46 |
|---|---|---|---|
| Feed (weight part) | | | |
| Nylon MXD6 | 100 | 100 | 100 |
| Nylon 66-(B) | 11 | 11 | 11 |
| Nylon 6-(B) | | | |
| Modified PPE | 117 | 117 | 117 |
| Glass fiber | 100 | 100 | 100 |
| Calcium carbonate | — | — | — |
| Flame retardant (a) | 11 | — | — |
| Flame retardant (b) | — | 11 | — |
| Flame retardant (c) | — | — | 11 |
| Melem | — | — | — |
| Red phosphorus | — | 2 | 2 |
| Condensed phosphate | 13 | — | — |
| Melamine cyanurate | — | — | — |
| Magnesium hydroxide | — | — | — |
| Properties | | | |
| Bending strength (kgf/cm$^2$) | 2250 | 2350 | 2340 |
| Flexural modulus (× 10$^3$ kgf/cm$^2$) | 82 | 89 | 89155 |
| Flammability (1/16 inch, UL94) | V-0 | V-0 | V-0 |
| Anti-mold contamination | ◎ | ◎ | ◎ |

What is claimed is:

1. A resin composition comprising:
   100 parts by weight of a resin component comprising a polyamide resin or a polyamide resin and a thermoplastic resin other than a polyamide resin, and
   1 to 50 parts by weight of a salt of polyphosphoric acid and melam or melam derivative, a salt of polyphosphoric acid and melem or melem derivative or a mixture thereof, each derivative containing a cyano or guanyl group or both.

2. A resin composition according to claim 1, wherein the polyamide resin is a polyamide resin obtained from xylylenediamine and α,ω-linear aliphatic dibasic acid, nylon 66, nylon 6 or a mixture of two or more of them.

3. A resin composition according to claim 1, wherein the thermoplastic resin other than polyamide resins is a polyphenylene ether resin.

4. A resin composition according to claim 3 wherein the polyphenylene ether resin is a modified polyphenylene ether resin.

5. A resin composition according to claim 1, wherein the phosphorus content in the salt of polyphosphoric acid and melam or a melam derivative, the salt of polyphosphoric acid and melem or a melem derivative or mixture thereof is 5 to 15% by weight based on the 100 parts by weight of the resin component.

6. A resin composition according to claim 1, wherein the average particle diameter of the salt of polyphosphoric acid and melam or a melam derivative, the salt of polyphosphoric acid and melem or a melem derivative or mixture thereof is not more than 50 μm.

7. A resin composition according to claim 1, which further comprises 0.1 to 20 parts by weight of a phosphoric flame retardant other than the salt of polyphosphoric acid and melam or a melam derivative, the salt of polyphosphoric acid and melem or a melem derivative or mixture thereof based on 100 parts by weight of the resin component.

8. A resin composition according to claim 7, wherein the phosphoric flame retardant other than the salt of polyphosphoric acid and melam or a melam derivative, the salt of polyphosphoric acid and melem or a melem derivative or mixture thereof has a percentage of loss in weight on heating of not more than 2% by weight in differential thermal analysis at 250° C.

9. A resin composition according to claim 7, wherein the phosphoric flame retardant other than the salt of polyphosphoric acid and melam or a melam derivative, the salt of polyphosphoric acid and melem or a melem derivative or mixture thereof is red phosphorus or a condensed phosphoric ester.

10. A resin composition comprising:
    100 parts by weight of a resin component comprising a polyamide resin or a polyamide resin and a thermoplastic resin other than a polyamide resin, and
    1 to 50 parts by weight of a salt of polyphosphoric acid and melam or melam derivative, a salt of polyphosphoric acid and melem or melem derivative or a mixture thereof, each derivative containing a cyano group or quanyl group or both, wherein the weight ratio of the melam or melam derivative to the melem or melem derivative is less than 90/10.

11. A resin composition comprising:
    100 parts by weight of a resin component comprising a polyamide resin or a polyamide resin and a thermoplastic resin other than a polyamide resin,
    1 to 50 parts by weight of a salt of polyphosphoric acid and melam or melam derivative, a salt of polyphosphoric acid and melem or melem derivative or a mixture thereof, each derivative containing a cyano group or quanyl group or both, and
    0.1 to 300 parts by weight of an inorganic filler based on 100 parts by weight of resin component.

12. A resin composition according to claim 14, wherein the inorganic filler is selected from the group consisting of glass fiber, calcium carbonate and aluminum borate whisker.

* * * * *

UNITED STATES PATENT AND TRADEMARK OFFICE
CERTIFICATE OF CORRECTION

PATENT NO.     : 6,225,383 B1
DATED          : May 1, 2001
INVENTOR(S)    : Masaki Hirono et al.

It is certified that error appears in the above-identified patent and that said Letters Patent is hereby corrected as shown below:

Title page,
Item [30], insert
-- May 26, 1997 (JP)         9-134748
   October 7, 1997 (JP)      9-274279

Signed and Sealed this

Eighth Day of January, 2002

Attest:

Attesting Officer

JAMES E. ROGAN
Director of the United States Patent and Trademark Office